United States Patent [19]

Chaplin

[11] Patent Number: 5,146,333
[45] Date of Patent: * Sep. 8, 1992

[54] SELF KEYER WITH PRE-EMPHASIZED FILL VIDEO

[75] Inventor: Daniel J. Chaplin, Nevada City, Calif.

[73] Assignee: The Grass Valley Group, Inc., Nevada City, Calif.

[*] Notice: The portion of the term of this patent subsequent to Apr. 24, 2007 has been disclaimed.

[21] Appl. No.: 418,353

[22] Filed: Oct. 6, 1989

[51] Int. Cl.$^5$ .............................................. H04N 5/275
[52] U.S. Cl. ........................................ 358/182; 358/183
[58] Field of Search .......................... 358/183, 22, 182

[56] References Cited

U.S. PATENT DOCUMENTS

| | | | |
|---|---|---|---|
| 4,028,727 | 6/1977 | Skrydstrup | 358/182 X |
| 4,121,253 | 10/1978 | McCoy | 358/182 X |
| 4,823,183 | 4/1989 | Jackson et al. | 358/22 |
| 4,851,912 | 7/1989 | Jackson et al. | 358/183 |
| 4,920,415 | 4/1990 | Chaplin | 358/183 |

Primary Examiner—James J. Groody
Assistant Examiner—Mark R. Powell
Attorney, Agent, or Firm—Francis I. Gray; John Smith-Hill

[57] ABSTRACT

An improved self keyer generates a pre-emphasized fill video signal that compensates for the multiplication of the fill video signal with a self key signal derived from the fill video signal, i.e., reduces the black content at the transition. The fill video signal is multiplied by twice the complement of the self key signal and then added to the fill video signal to produce the pre-emphasized fill video signal. The pre-emphasized fill video signal is then combined with a background video signal under control of the self key signal.

4 Claims, 3 Drawing Sheets

ORIGINAL FILL (RAMP)

SELF KEY

FILL * KEY
DESIRED
ACTUAL

SELF KEY ERROR (DESIRED-ACTUAL)
25%
$(1-x^2)$ FUNCTION

SELF KEYER WITH PRE-EMPHASIZED FILL VIDEO

BACKGROUND OF THE INVENTION

The present invention relates to video key generators, and more particularly to an improved self keyer that minimizes black content at the boundary between a background video and a fill video.

A self key signal is generated from a fill video that is to be inserted over a background video. The transition between the background video and the fill video has some duration and the edge of the fill video is bounded by black, or the absence of a signal, so that the resulting transition has some black content remaining that is visible and undesirable. This black content artifact is especially noticeable when the luminance of the fill and background videos are similar so that a gap is visually apparent between them. Traditionally when this condition exists, a high gain key signal with a high value clip level is selected in the key generator so that the gap is very narrow and the luminance of the fill video in the gap is high. However this has a rather unpleasant appearance because the edges of the resultant key signal are harsh and any noise in the edges is noticeable.

A conventional self keyer is shown in FIG. 1. The fill and background videos are input to a mixer 10 at ports Y and Z, respectively, together with a key signal, or mixer control signal, at port X. The key signal is derived from the fill video by inputting the fill video to a clip and gain amplifier (keyer) 12 that generates the key signal according to the settings of the clip and gain controls. A delay line 11 is interposed between the fill video input and the mixer 10 to compensate for the processing time of the keyer 12. As shown in FIG. 2 for three different clip and gain settings the output from the mixer 10 has a certain amount of black content at the edges of the fill video.

One proposal for reducing the amount of black content is disclosed in co-pending U.S. patent application Ser. No. 07/325,844 filed on Mar. 20, 1989, now U.S. Pat. No. 4,920,415 by Daniel J. Chaplin entitled "Self Keyer". A second preconditioned key signal is derived from the self key signal and is used to mix the fill video with a gray luminance signal that is adjustable to provide a visual match with the fill video. The result is a smooth luminance transition between the background and fill videos.

What is desired is an improved self keyer that minimizes the black content and the resulting undesirable appearance at the boundary of the transition between background and fill videos without deriving a second key signal from a self key signal.

SUMMARY OF THE INVENTION

Accordingly the present invention provides an improved self key by pre-emphasizing the fill video signal during a key transition such that a resulting self key has significantly reduced black content or self key error. The fill video is multiplied by twice the complement of a key control signal, and the resultant is summed with the original fill video to produce the pre-emphasized fill video signal. This pre-emphasized fill video signal is then keyed into a background video signal in a traditional manner using a self key control derived from the original fill video.

The objects, advantages and other novel features of the present invention are apparent when the following detailed description is read in light of the appended claims and attached drawing.

DESCRIPTION OF THE PREFERRED EMBODIMENT

Figure 1:
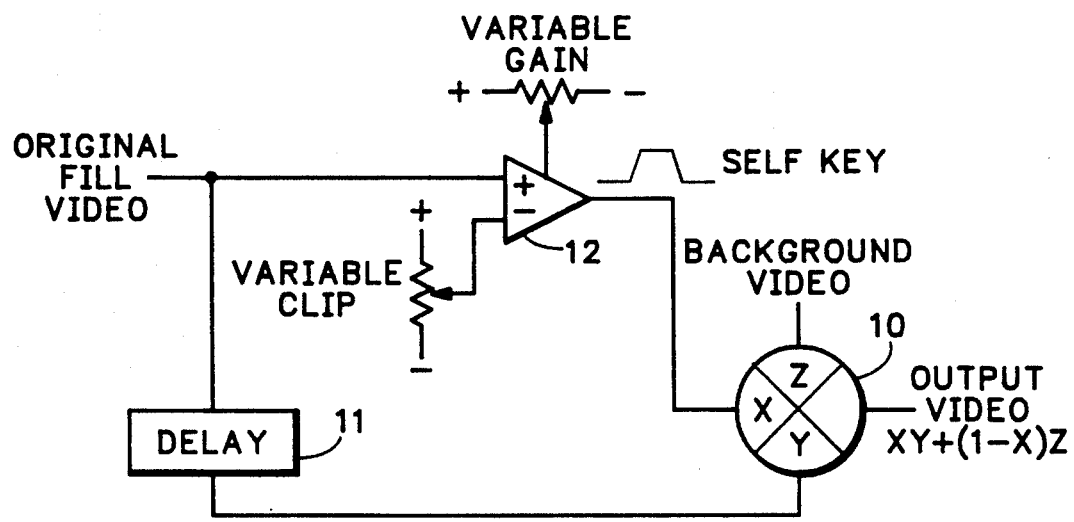
FIG. 1 is a block diagram of a traditional self key generator.
Figure 2A:
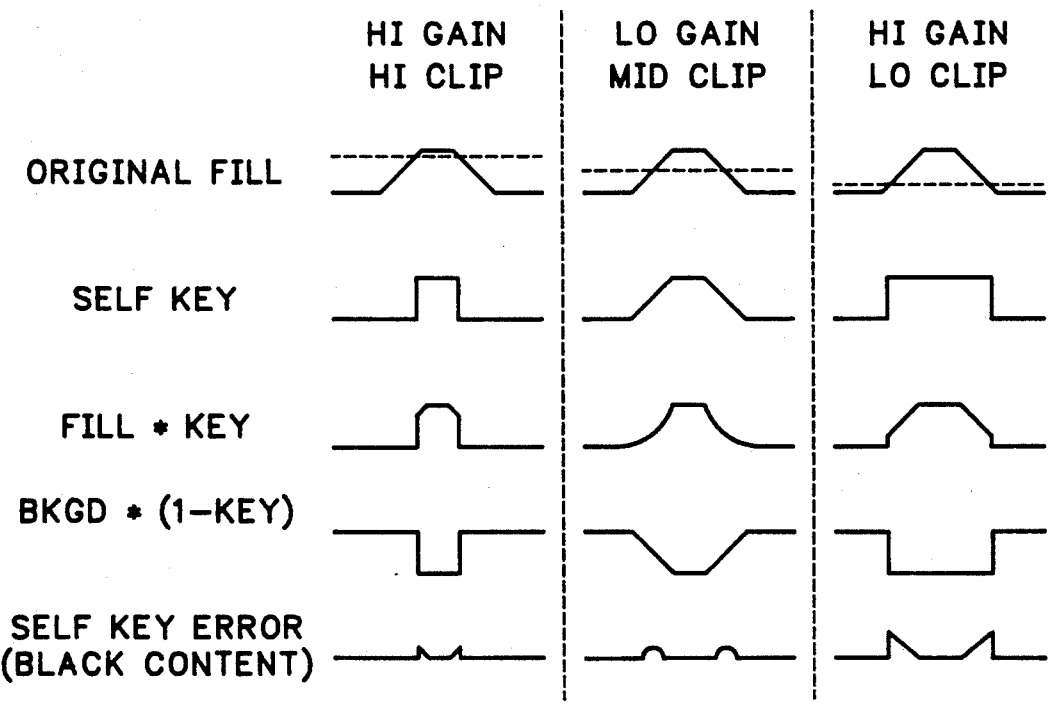
FIGS. 2a and 2b are waveform diagrams exemplifying the operation of the traditional self key generator of FIG. 1.
Figure 3:
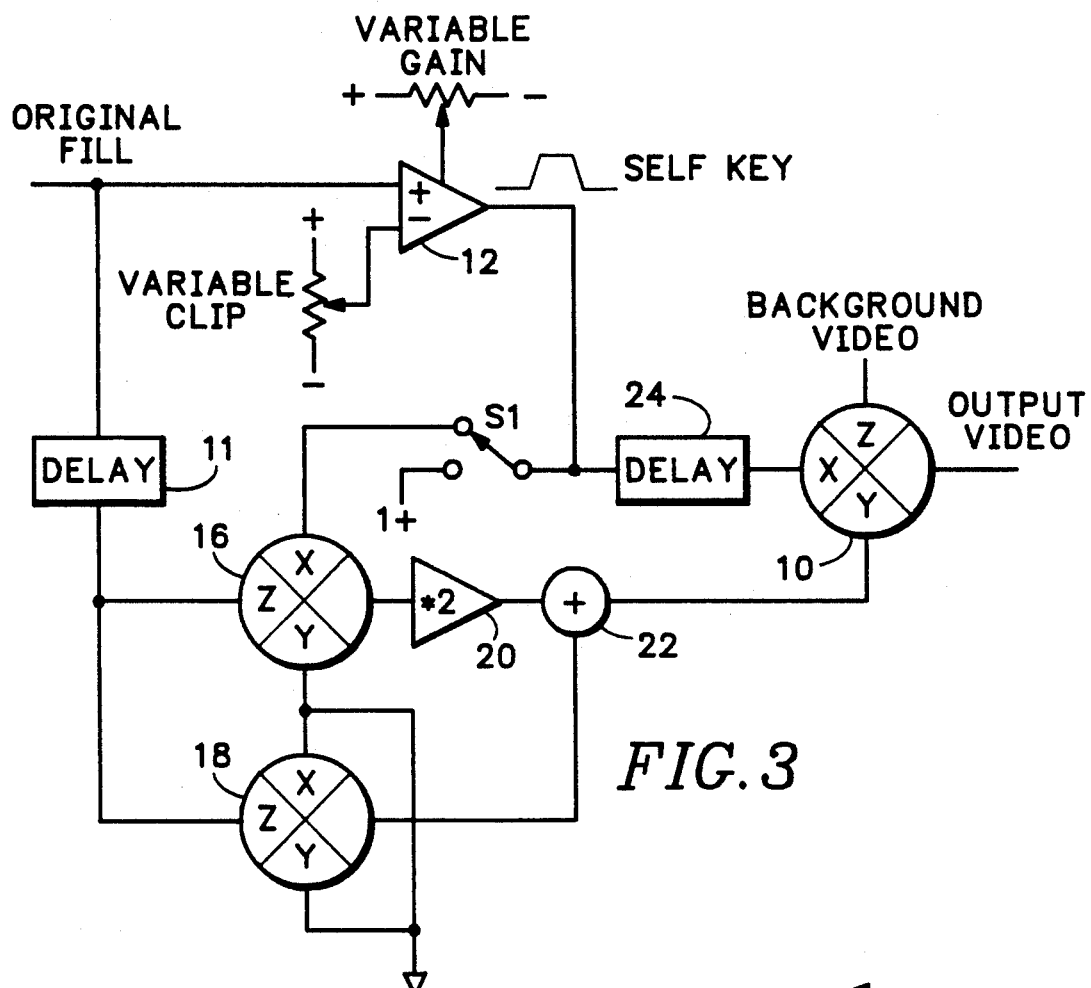
FIG. 3 is a block diagram of an improved self key generator according to the present invention.
Figure 2B:
Figure 2B:
Figure 2B:
Figure 2B:
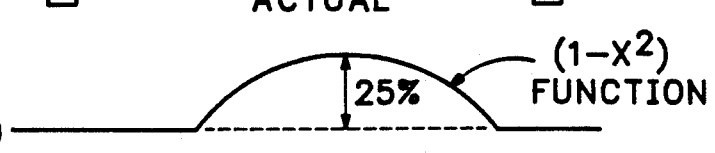
Figure 4:
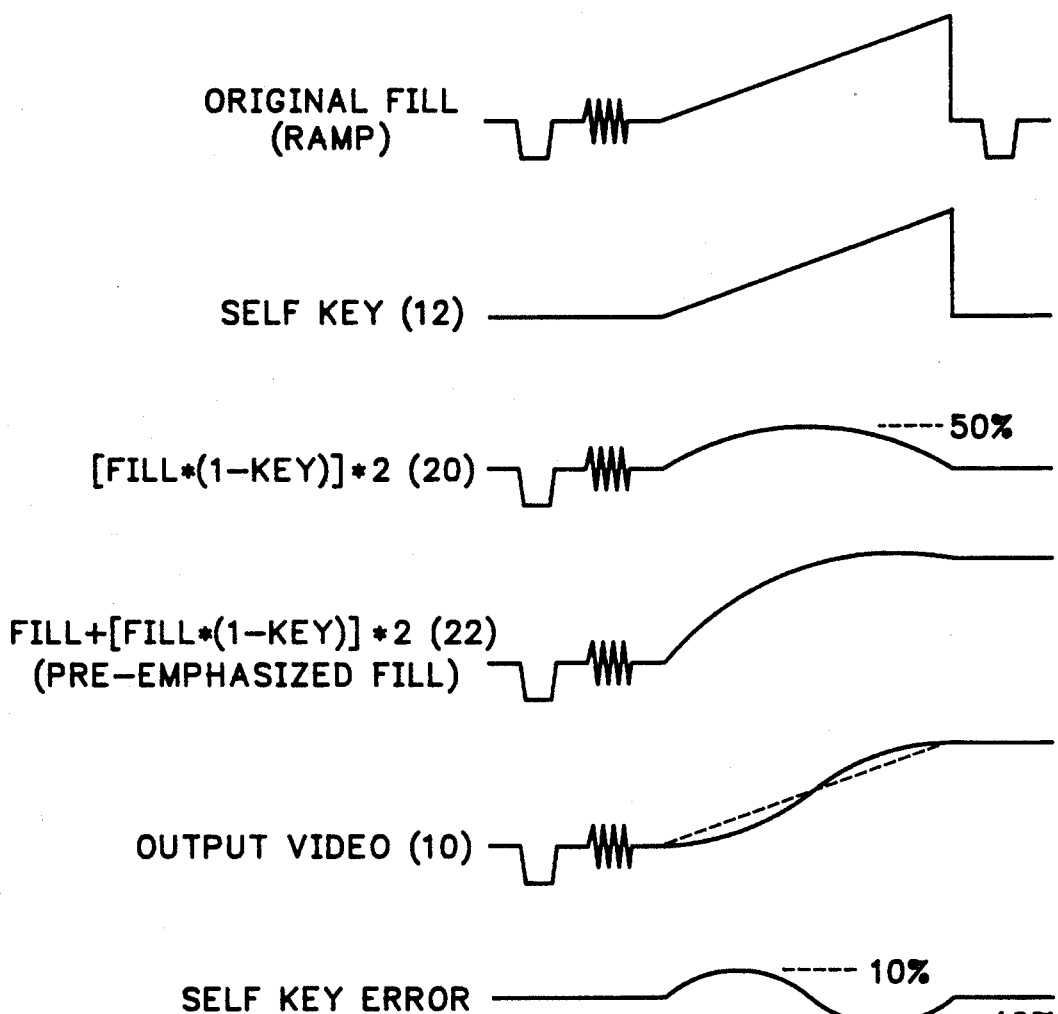
FIG. 4 is a waveform diagram exemplifying the operation of the improved self key generator of FIG. 3.

Referring now to FIGS. 3 and 4 a fill video signal is input to a keyer clip and gain circuit 12 and to a delay circuit 11. The output of the keyer 12 is a conventional self key signal, k. The delayed fill video from the delay circuit 11 is input to a pair of mixers 16, 18 having outputs defined by $XY+(1-X)Z$. The output of the second mixer 18 is the delayed fill video delayed an additional amount by the processing time of the mixer. The first mixer 16 is controlled by the key signal, k, via switch S1 to produce an output of $FILL*(1-k)$. The second position of the switch S1 allows the keyer to operate as a traditional self key generator. The output of the first mixer 16 is input to an amplifier 20 having a gain of two to produce at the output $FILL*(1-k)*2$. The output of the second mixer 18 and the amplifier 20 are input to a summation circuit 22 to produce a pre-emphasized fill video signal, $FILL+FILL*(1-k)*2$. The self key signal, k, also is input to another delay circuit 24 that compensates for the processing time of the mixers 16, 18. The pre-emphasized fill video signal and a background video signal are combined by the delayed self key signal in a conventional manner by an output mixer 10 to produce an output video signal.

Figure 5:
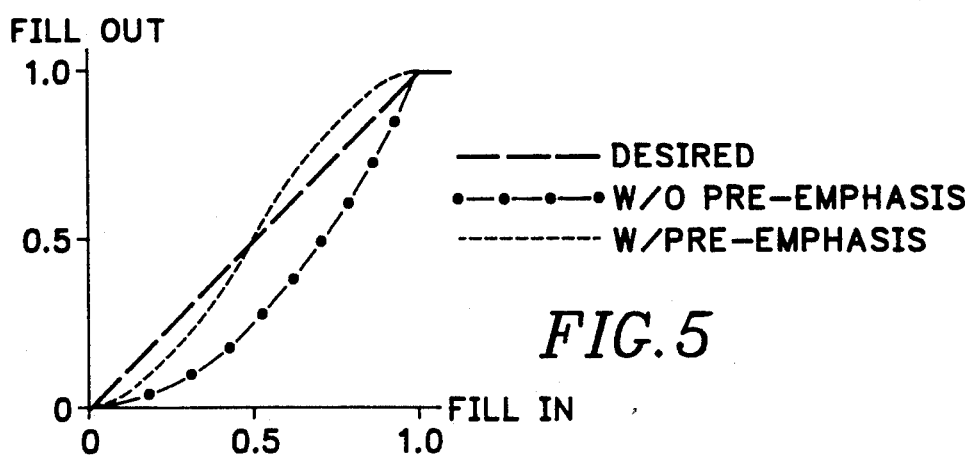
FIG. 5 is a graphic diagram comparing the transfer functions of the traditional and improved self key generators.

The result of forming a pre-emphasized fill video is to use the fill video to replace the black content between the fill and background videos. The maximum self key magnitude error is reduced from 25% to +/10%, and the integrated error is reduced from 33% to zero. FIG. 5 shows a comparison between the results achieved with and without using the pre-emphasized fill video versus the ideal. The result is that artifacts of the combining of fill video with background video are much less visible, and the circuitry may be easily implemented within existing multilevel keyer architectures, especially mix effects with more than one key level. Since the fill is modified before the mixer 10, no special problems with prioritization are encountered. With the self key error reduced, the keyer clip and gain circuit 12 is adjustable over a greater range to allow generation of softer key edges which are generally more visually pleasant and less noisy. Also, because the key signal is not narrowed, fine details in the fill are preserved, giving the impression of higher resultant detail. An additional advantage is the preservation of anti-aliased edges which are normally destroyed when self keying with high gain and high clip.

Thus the present invention provides an improved self keyer by modifying the fill video signal before it is keyed into the background signal to reduce the resultant error, the modification consisting of making a sample of the fill video during a transition, processing it, and then combining the result with the original fill video.

What is claimed is:

1. An improved self keyer for combining a fill video signal with a background video signal comprising:

means for modifying the fill video signal during a transition to produce a pre-emphasized fill video signal that compensates for multiplication when the fill video signal is multiplied by a self key signal derived from the fill video signal; and means for combining the pre-emphasized fill video signal with the background video signal under control of the self key signal.

2. An improved self keyer as recited in claim 1 wherein the modifying means comprises:

means for deriving the self key signal from the fill video; and means for producing the pre-emphasized fill video signal from the fill video signal under control of the self key signal.

3. An improved self keyer as recited in claim 2 wherein the producing means comprises:

means for generating an intermediate fill video signal having the form $FILL*(1-k)*2$ where FILL is the fill video signal and k is the self key signal; and means for summing the intermediate fill video signal with the fill video signal to produce the pre-emphasized fill video signal.

4. An improved self keyer as recited in claim 3 wherein the generating means comprises:

means for multiplying the fill video signal with a complement (1-k) of the self key signal to produce $FILL*(1-k)$; and means for amplifying the output of the multiplying means by a factor of two to produce the intermediate fill video signal.

* * * * *